(12) United States Patent
Melton (10) Patent No.: US 11,869,083 B2
(45) Date of Patent: *Jan. 9, 2024

(54) FAIR CREDIT SCREENED MARKET DATA DISTRIBUTION

(71) Applicant: Refinitiv US Organization LLC, New York, NY (US)

(72) Inventor: Hayden Paul Melton, Philadelphia, PA (US)

(73) Assignee: Refinitiv US Organization LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,995

(22) Filed: May 23, 2022

(65) Prior Publication Data

US 2022/0284509 A1 Sep. 8, 2022

Related U.S. Application Data

(63) Continuation of application No. 14/535,776, filed on Nov. 7, 2014, now Pat. No. 11,341,572.

(Continued)

(51) Int. Cl.
*G06Q 40/04* (2012.01)

(52) U.S. Cl.
CPC .................... *G06Q 40/04* (2013.01)

(58) Field of Classification Search
CPC ..................................................... G06Q 40/04
See application file for complete search history.

(56) References Cited

U.S. PATENT DOCUMENTS

| 7,055,030 | B2 | 5/2006 | Negawa |
| 7,333,610 | B2 | 2/2008 | Dallard |

(Continued)

FOREIGN PATENT DOCUMENTS

| CA | 2422153 | 9/2003 |
| CN | 1988690 | 6/2007 |

(Continued)

OTHER PUBLICATIONS

Molvizadah, Vasiq, "Analyzing FTP Traffic . . . Overview of FTP Communications", Retrieved from the Internet: <URL: https://medium.com/@vasiqmz/analyzing-ftp-traffic-cfd1b18bf30a>, [retrieved on Oct. 28, 2022], Jan. 2, 2018 (Jan. 2, 2018), XP055975880,, pp. 1-6.

(Continued)

*Primary Examiner* — John W Hayes
*Assistant Examiner* — Zehra Raza
(74) *Attorney, Agent, or Firm* — Sheppard Mullin Richter & Hampton LLP (57) ABSTRACT

The invention relates to systems and methods for distributing market data. In one implementation, the system may generate a new encryption key at each market data update, and use that key to encrypt each market participant's data in that update before it is sent. Among other factors, characteristics of modern computer networks may cause participants to be sent (and to receive) their encrypted data in that update at different times. After the participants have all been sent their data in that update the system may then simultaneously transmit to those participants the key that will enable them to decipher their data. In an implementation, the key may be transmitted via a multicast transport protocol which can be used to ensure all recipients receive it at the same time. In this manner the invention may ensure that although participants receive their data in a given update at different times, they are unable to decipher that data until substantially the same time.

20 Claims, 4 Drawing Sheets

Related U.S. Application Data (60) Provisional application No. 61/901,551, filed on Nov. 8, 2013.

(56) References Cited

U.S. PATENT DOCUMENTS

| | | |
|---|---|---|
| 7,636,683 B1 | 12/2009 | Mills |
| 8,010,450 B2 | 8/2011 | Palmer |
| 8,416,801 B2 | 4/2013 | Howorka |
| 8,504,667 B2 | 8/2013 | Howorka |
| 2002/0097878 A1 | 7/2002 | Hiromichi |
| 2002/0120837 A1 | 8/2002 | Maxemchuk |
| 2003/0046539 A1 | 3/2003 | Negawa |
| 2003/0126056 A1 | 7/2003 | Hausman |
| 2004/0001087 A1 | 1/2004 | Warmus |
| 2004/0019553 A1 | 1/2004 | Setz |
| 2004/0059668 A1 | 3/2004 | Togher |
| 2004/0101138 A1 | 5/2004 | Revital |
| 2004/0260839 A1 | 12/2004 | Onoda |
| 2006/0059079 A1 | 3/2006 | Howorka |
| 2009/0276503 A1 | 11/2009 | Renger |
| 2012/0102523 A1 | 4/2012 | Herz |
| 2012/0250865 A1 | 10/2012 | Terpstra |
| 2015/0134533 A1 | 5/2015 | Melton |

FOREIGN PATENT DOCUMENTS

| | | |
|---|---|---|
| CN | 102395113 | 3/2012 |
| JP | 1127252 | 1/1999 |
| WO | 0191465 | 11/2001 |
| WO | 0198903 | 12/2001 |

OTHER PUBLICATIONS

Nowlan, Michael F., "A Wire-Compatible TCP Implementation for Low-Latency Applications", Doctoral Dissertation, Yale University, 2014, 92 pages.

"Overview of IP Multicast", Cisco White Paper, printed from http://www.cisco.com/en/US/tech/tk828/technologies_white_paper09186a0080092942.shtml, Accessed Nov. 10, 2013, 5 pages.

Chan, Aldar C-F., et al. "Scalable, Server-Passive, User-Anonymous Timed Release Cryptography," Proceedings of the 25th IEEE International Conference on Distributed Computing Systems (ICDCS'05), IEEE, 2005, 10 pages.

FAIR CREDIT SCREENED MARKET DATA DISTRIBUTION

CROSS-REFERENCE TO RELATED APPLICATIONS

This application is a continuation of U.S. patent application Ser. No. 14/535,776, filed Nov. 7, 2014, entitled "FAIR CREDIT SCREENED MARKET DATA DISTRIBUTION" (which issued as U.S. Pat. No. 11,341,572 on May 24, 2022), which claims priority to U.S. Provisional Patent Application Ser. No. 61/901,551, filed Nov. 8, 2013, entitled "FAIR CREDIT SCREENED MARKET DATA DISTRIBUTION," the contents of which are incorporated by reference in their entirety herein.

FIELD OF THE INVENTION

The invention relates to systems and methods for distributing market data from an electronic trading venue.

BACKGROUND OF THE INVENTION

Many electronic trading venues operate central limit order books (CLOBs) for the instruments that trade on them. Orders for a given instrument from market participants are processed against that instrument's CLOB. The CLOB's state manifests as the bid (buy) and offer (sell) orders it contains, which are typically arranged by side, price and time of receipt. As such, each order may cause the CLOB to change its state. The order can cause the state of the CLOB to change as a result of a match (an existing buy order being matched with a newly received sell order, and vice versa), a cancelation (a removal of an order), an amendment (a change in order's price or quantity), or a new order being "inserted" into the CLOB as a bid or offer.

On a given venue, the state of an instrument's CLOB may be reflective of the market supply and demand for that instrument. Since market participants' decisions to buy and sell an instrument are informed at least in part by the prevailing supply and demand for that instrument, many electronic trading venues operate so as to disseminate a view of the CLOB to the market participants on that venue. This view of the CLOB is disseminated in so-called market data updates. The precise nature of the view and the specific frequency at which the view is disseminated as market data updates varies by venue. But since supply and demand changes with respect to time, and since market participants need a contemporaneous view of supply and demand on which to inform their trading decisions, over a long time horizon an electronic trading venue will tend to send out a very large number of market data updates.

On some electronic trading venues, at any given market data update, the same view of the CLOB will be transmitted to all interested market participants. In other words, information from the market data update will be the same for all interested market participants. Thus, a point-to-multipoint or one-to-many communication protocol can be used to transmit this information from the venue to all interested market participants. To this end, on many real-life electronic trading venues, especially in the equities and futures markets, where the same view of the CLOB is transmitted to all interested market participants, the IP Multicast protocol is used.

However, on other electronic trading venues, it is not possible (or not practical) to send the same view of the CLOB to all interested market participants at a given market data update. In the spot foreign exchange (spot FX) market, for example, there is generally no central counterparty against which all market participants trade. Instead trades occur based on bilateral credit relationships among the market participants. If a market participant wishes to see a view of the CLOB containing only the orders against which the market participant can actually trade, then in generating that view orders in the CLOB submitted by other participants with whom the market participant does not have bilateral credit must be excluded (or equivalently "screened") from the view. Since the credit a participant extends, and that which is extended to them generally varies across all pairs of participants, the credit-screened (herein simply "screened") view of the CLOB is generally different per market participant, even when those views are all taken from the same point-in-time state of the CLOB. From a computer networking perspective, when generally different data has to be sent to different recipients, a point-to-point or one-to-one communication protocol may be used to transmit a market data update from the venue to all interested market participants. To this end, on many electronic trading venues where it is necessary to send different views of the CLOB to different participants within the same market data update, the TCP/IP protocol is used.

Operators of electronic trading venues have obligations to ensure fairness in their venues. One aspect of fairness is ensuring market data updates are received by (or at least sent to) market participants at substantially the same time. It is understood and widely-accepted that in an appropriately designed computer network, where the length of cables and network devices connecting each recipient to the sender of the data are the same across all recipients, IP Multicast can ensure all recipients receive each piece of data sent by the sender at substantially the same time. In this regard, operators of electronic trading venues in which the same view of the CLOB is sent to all market participants at each market data update can more easily ensure fairness in market data distribution. However, on electronic trading venues in which a different view of the CLOB is sent to each participant at each market data update, achieving fairness in market data distribution is more difficult.

Modern computer networks serialize data and in doing so impose a total ordering of the data being sent. As a result of this property of computer networks, a system intended to transmit data in a point-to-point manner to a plurality of recipients "all at once" may, in fact, fail to provide all recipients with data at the same time. With respect to sending different views of the CLOB to different market participants, and depending on the bandwidth of the network, size in bytes of the views and number of participants to which the views are being sent, this approach to sending all data "all at once" could result in 100's of microseconds (μs) or even several milliseconds elapsing between the first market participant's view of the CLOB being sent at a given market update, and the last participant's view of the CLOB being sent at that same update. In the context of market data distribution, this is not fair. To run a fair market, market participants should have access to prices at the same time. These and other drawbacks exist.

SUMMARY OF THE INVENTION

The invention addressing these and other drawbacks relates to systems and methods for ensuring that data distributed to multiple recipients is accessible by all of the recipients at substantially the same time, regardless of when the data is actually received by each recipient. For example, a system may distribute data encoded in a manner that is inaccessible (e.g., encrypted) without additional information (e.g., an encryption key used to encrypt/decrypt the data). Thus, a recipient who receives the data before another recipient may be unable to access or otherwise read the data without the additional information, preventing the recipient from taking advantage of having received the data before other recipients. The system may distribute the additional information at a time that is common to all of the recipients so that each recipient may decipher (or decrypt) the data at substantially the same time as the other recipients. For example, once the system has distributed the data to each of the recipients, the system may provide the additional information to each of the recipients at substantially the same time.

An exemplary use of the system relates to distribution of information for a market data update relating to a financial instrument to market participants. A market data update may indicate the prevailing supply and demand (e.g., as indicated by buy and/or sell orders in a CLOB) at a given time for a given instrument, that market participants may use to gauge whether to buy or sell the instrument.

In some instances, information from a market data update may be uniquely screened for a given market participant. For example, the system may determine a market participant's credit (e.g., ability to execute trades with other parties) and generate credit screened market data based on the market data update and the market participant's credit. The system may likewise perform such screening for other market participants using the market data update and the other market participants' credit. As such, credit screened market data based on a market data update may be generated for and distributed to a market participant sooner than other credit screened market data for another market participant. In these instances, the system may ensure that each market participant may access its own credit screened market data relating to an instrument only after other market participants have likewise received (or have been sent) their respective credit screened market data relating to the instrument.

The systems and methods will be described herein with respect to credit screened market data for clarity of illustration and not limitation. For example, the system may be used in other contexts to ensure that data distributed to multiple recipients (whether or not completely unique to each recipient) and received at different times is made accessible at substantially the same time for all recipients. Furthermore, the system may be used to ensure that different data provided to a single recipient is accessible by that recipient at the same time. For instance, the system may provide first data to a recipient at a first time and second data to the recipient at a second time. Both the first data and the second data may be inaccessible without additional information. The system may provide the additional information to the recipient so that the recipient may access (or decode, or decipher) the first data and the second data only after the additional information is provided. Having described a high level overview of exemplary system functions, attention will now be turned to an example of encoding the data provided to recipients.

Encrypting Credit Screened Market Data and Delaying the Provision of Encryption Keys to Market Participants In an implementation, the additional information required to access credit screened market data may include an encryption key. For example, the system may generate an encryption key (e.g., an initially secret random key) used to encrypt the credit screened market data before distributing the credit screened market data to the market participants.

Because each credit screened market data is encrypted, even if a market participant receives its credit screened market data before other market participants, the market participant will be unable to decipher the contents of the credit screened market data until the system provides (and the market participant receives) the encryption key.

After the system has distributed the encrypted credit screened market data to each market participant, the system may provide the encryption key to all of the market participants (substantially simultaneously) to whom encrypted credit screened market data were distributed.

In an implementation, the system may provide the encryption key via a multicast (e.g., one-to-many or many-to-many distribution) transport protocol, which transmits the encryption key to the market participants at the same time (or substantially the same time).

In an implementation, the system may provide the encryption key to the market participants only after occurrence of predetermined criteria. For example, the system may provide the encryption key to market participants only after it has been confirmed that encrypted credit screened market data has been transmitted to (e.g., "put on the wire") and/or received by all market participants that were to receive respective encrypted credit screened market data. In this manner, the system may ensure that all market recipients have received their respective encrypted credit screened market data before providing an encryption key used to decrypt the credit screened market data.

Distributing Market Updates in Parallel and Synchronizing Provision of Encryption Keys In an implementation, because the volume of market data updates may be (and typically is) high, the system may employ a plurality of credit screening processes (herein simply "screeners") that are executed in parallel to minimize processing times. Each screener may be responsible for generating a market data update for a subset of market participants, performing credit screening using the CLOB and bilateral credit relationships among the subset of participants as input to that process, and generating and distributing credit screened market data to its respective set of market participants. The system may generate a single encryption key for each market data update and provide that encryption key to the screeners so that they may each encrypt the credit screened market data using the encryption key prior to distribution to the market participants.

The system may synchronize provision of the encryption key to market participants based on whether each of the screeners have provided encrypted credit screened market data to their respective sets of market participants. In other words, the system may provide the encryption key to market participants only when the encrypted credit screened market data has been transmitted to and/or received by all of the market participants that should have been provided with respective encrypted credit screened market data.

The system may determine whether the encrypted credit screened market data were provided to market participants in various ways. For example, the system may provide the encryption key only after each screener has verified that it has distributed the encrypted credit screened market data to its respective set of market participants. In another example, a downstream listener may detect when a screener has provided encrypted credit screened market data to a market participant and report such detection to the system.

Mapping Market Updates with Corresponding Encryption Keys

In an implementation, the system may associate the encrypted credit screened market data with an encryption key used to encrypt the credit screened market data. The encrypted credit screened market data may therefore be unambiguously mapped to a given encryption key used to encrypt the market update (and vice versa) based on the association. The system may associate encrypted credit screened market data with an encryption key in various ways. For example, the system may prepend or append a clear text string that is not encrypted to both the encrypted credit screened market data and the encryption key. In this manner, the clear text string may be used to associate the encrypted credit screened market data with the encryption key. In another example, the system may store a table that associates an identifier (e.g., a filename) of the encrypted credit screened market data with an identifier of a corresponding encryption key.

In whichever manner the system associates the encrypted credit screened market data with an encryption key, the system may use the association to identify an encryption key used to encrypt the encrypted credit screened market data and vice versa. For example, the system may receive a request, from a market participant, to provide an encryption key for the encrypted credit screened market data identified in the request. This may occur in implementations in which the encryption key is provided via a multicast transport protocol or other non-reliable network protocol in which delivery of data is not guaranteed, a market participant may not have received the encryption key. Responsive to the request, the system may identify the appropriate encryption key based on an association between the encrypted credit screened market data and the appropriate encryption key. If the encryption key has already been provided to other market participants, the system may provide the encryption key to the requesting market participant. On the other hand, if the encryption key has not been provided to other market participants, the system may deny the request.

Using the system described herein, a market participant may be provided with its credit screened market data that is accessible only when other market participants have also been provided with their respective credit screened market data, regardless of when the credit screened market data is actually transmitted to and/or received by each recipient.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
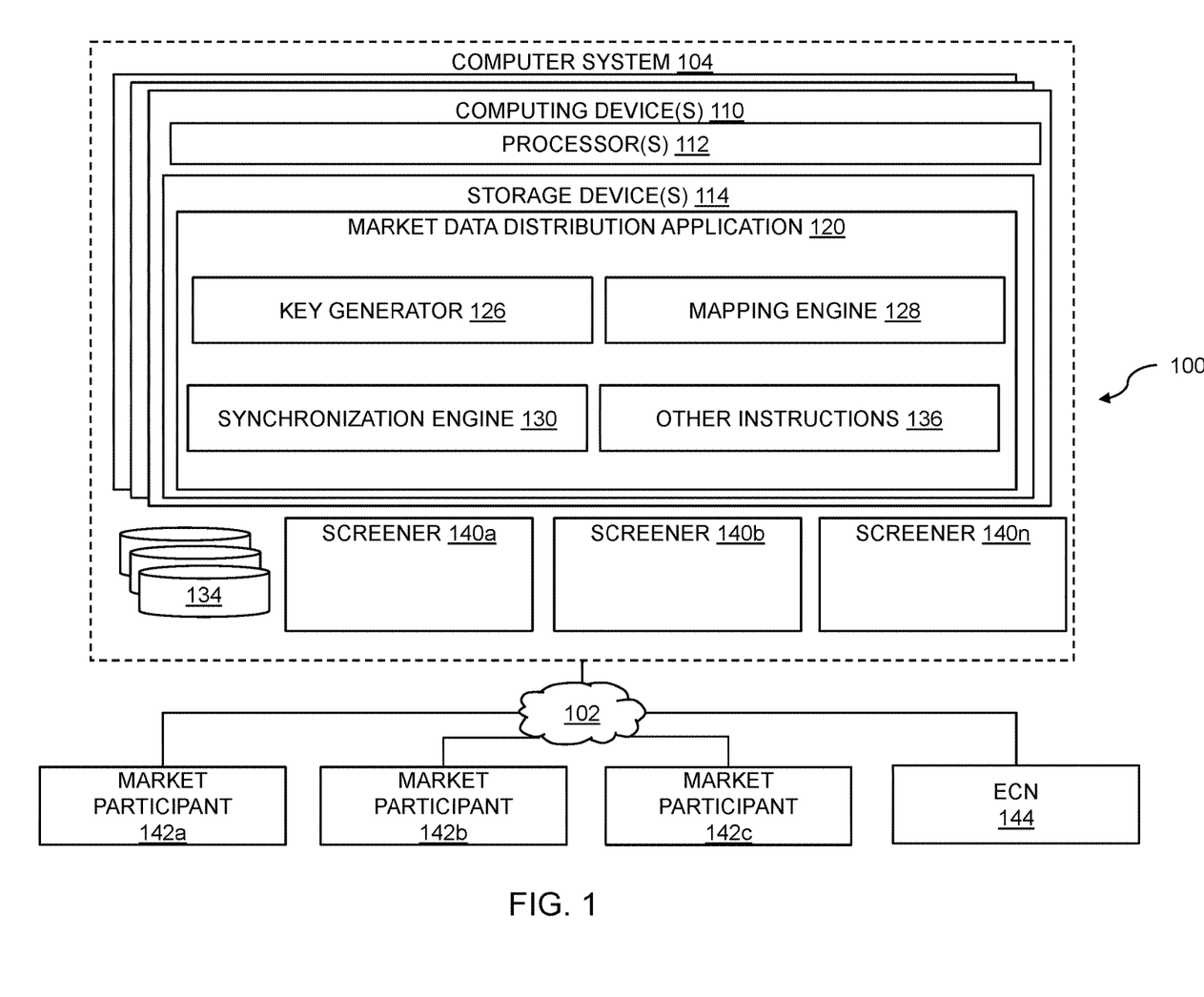
FIG. 1 illustrates a system for distributing fair credit screened market data, according to an implementation of the invention.

FIG. 1 illustrates a system 100 for distributing credit screened market data, according to an implementation of the invention. System 100 may distribute data encoded in a manner that is inaccessible (e.g., encrypted) without additional information (e.g., an encryption key used to encrypt/decrypt the data). Although described herein using examples of encryption, other conventional data obfuscation techniques may be used as well.

A recipient who receives the data before another recipient may be unable to access or otherwise read the data without the additional information, preventing the recipient from taking advantage of having received the data before other recipients. The system may distribute the additional information at a time that is common to all of the recipients so that each recipient may decipher the data at substantially the same time as the other recipients. For example, once the system has distributed the data to each of the recipients, the system may provide the additional information to each of the recipients at substantially the same time.

System 100 may be used to distribute credit screened market data to market participants, although alternative uses of system 100 will be apparent using the disclosure herein. System 100 may encrypt all or a portion of the credit screened market data utilizing an encryption key, such as a random encryption key. System 100 may transmit the encrypted credit screened market data to the market participants. Because the credit screened market data is encrypted, the market participants are unable to decrypt the credit screened market data without the encryption key. As such, without the encryption key, a market participant that receives the encrypted credit screened market data before another market participant will be unable to access the credit screened market data before the other market participant.

System 100 may determine that each of the market participants have received the encrypted credit screened market data (or at least that the encrypted credit screened market data has been transmitted to each of the market participants). For example, system 100 may receive an express acknowledgement of receipt from each market participant, detect that the encrypted credit screened market data has been transmitted to each market participant, receive an indication from one or more components responsible for transmitting the encrypted credit screened market data to the market participants, and/or otherwise determine that each of the market participants have received the encrypted credit screened market data.

Upon a determination that the encrypted credit screened market data has been transmitted to and/or received by each of the market participants, system 100 may simultaneously transmit the encryption key associated with the encrypted credit screened market data to all of the market participants. For example, system 100 may transmit the encryption key simultaneously to the market participants using a one-to-many or many-to-many distribution protocol (e.g., IP Multicast). Upon receipt of the encryption key, each market participant may decrypt and decipher the credit screened market data, which may include its credit screened prices and quantities for a financial instrument.

Having described a high level overview of some of the system functions, attention will now be turned to various system components that facilitate these and other functions.

System Components

System 100 may include a computer system 104, one or more computing devices 110, one or more databases 132, one or more screeners 140a, 140b, . . . , 140n, one or more market participant devices 142a, 142b, . . . , 142n, a trading system's electronic communication network (ECN) 144, and/or other components. Each computing device 110 may include one or more processors 112, one or more storage devices 114, and/or other components. Processor(s) 112 may be programmed by one or more computer program instructions, which may be stored in storage device(s) 114. The one or more computer program instructions may include, without limitation, market data distribution application 120.

Market data distribution application 120 may itself include different sets of instructions that each program the processor(s) 112 (and therefore computer system 104). For example, market data distribution application 120 may include an key generator 126, a mapping engine 128, a synchronization engine 130, and/or other instructions 136 that program computer system 104. Screeners 140 may each relate to processes executing on computer system 104. As such, market data distribution application 120 may include instructions that cause screeners 140 to execute on one or more physical processors. As used herein, for convenience, the various instructions will be described as performing an operation, when, in fact, the various instructions program computer system 104 to perform the operation.

Figure 2:
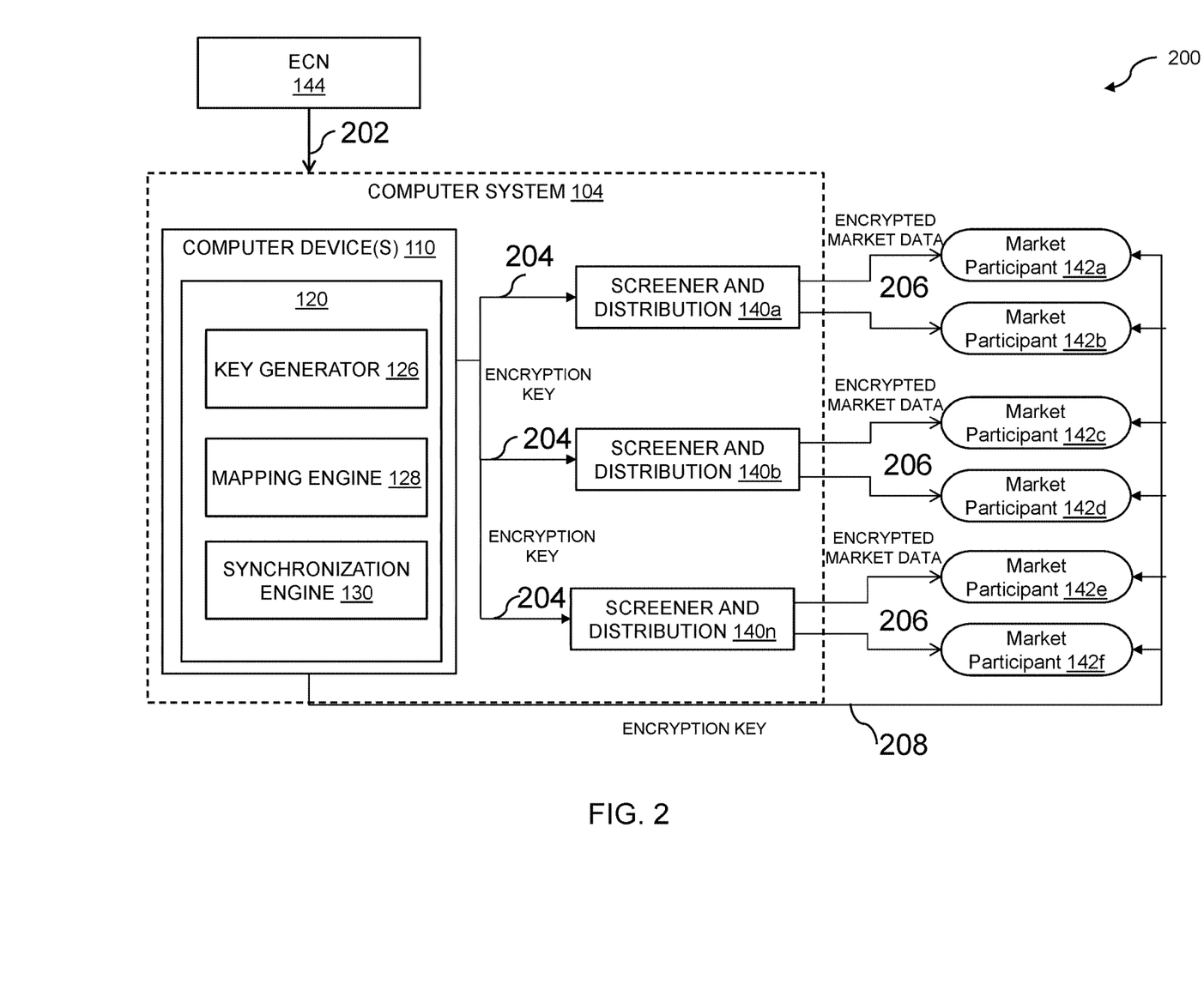
FIG. 2 depicts a flow diagram for components of system that facilitate distribution of credit screened market data, according to an implementation of the invention.

FIG. 2 depicts a flow diagram 200 for components of system 100 that facilitate distribution of credit screened market data, according to an implementation of the invention. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, market data distribution application 120 may receive CLOB state information associated with a financial instrument and credit relationship information from ECN 144 and/or other information source. The CLOB state information may reflect the prevailing price and quantity information of a given financial instrument at a given point in time. The credit relationship information may reflect credit relationships among different parties at the given point in time.

Generating and Encrypting Credit Screened Market Data

In an implementation, key generator 126 may generate an encryption key used to encrypt data relating to the CLOB state information at the given point in time. For example, key generator 126 may generate an encryption key used to encrypt data each time that CLOB state information for a given financial instrument is received. An encryption key may generally refer to a piece of information (e.g., a random number, a hash, a parameter, etc.) that determines the functional output of a process used to encrypt data.

In an operation 204, market data distribution application 120 may provide each screener 140 with the encryption key, the CLOB state information, and the credit relationship information. In an implementation, each screener 140 is responsible for its own set of market participants 142 for which it must perform credit screening. For example, screener 140A may parse the credit relationship information relevant to market participant 142A. Screener 140A may determine actual trades that market participant 142A can execute for a financial instrument based on the parsed portions. Screener 140A may generate credit screened market data based on and CLOB state information and the actual trades that market participant 142A can make. For instance, the credit screened market data for market participant 142A may include a top of book bid/offer for a spot FX instrument (formatted as quantity@price) of 5M@1.0001/3M@1.0002 on a given instrument at a given point in time, whereas, for the same point in time and the same instrument, the credit screened market data for market participant 142B may include a bid/offer of 3M@1.0001/1M@1.0003.

Screener 140A may perform the foregoing for market participant 142B and any other market participants 142 for which screener 140A is responsible. Screener 140B and/or other screeners 140N may likewise generate credit screened market data for their respective market participants 142C-F as well.

Each screener 140 may encrypt each credit screened market data using the encryption key prior to transmission to an intended market participant 142. Such encryption may use the Advanced Encryption Standard (AES), or may be an XOR cipher used as a One Time Pad, or some other encryption standard or technique. All screeners may use the same encryption key (received from key generator 126) for encrypting credit screened market data. Of course, this encryption key will be replaced by a new encryption key when new CLOB state information is received.

Transmitting the Encrypted Credit Screened Market Data

In an operation 206, each screener 140 may transmit the encrypted credit screened market data to respective market participants. Such transmission may employ a point-to-point communication protocol such as, without limitation, TCP/IP. Because of the nature of point-to-point protocols, as well as the customized nature in which each market recipient 142 is provided with credit screened market data, a given market participant 142 may receive its credit screened market data before another market participant. However, because each credit screened market data is encrypted prior to transmission, the given market participant 142 may not decrypt the encrypted credit screened market data without the encryption key. It should be noted that, in some implementations, a given screener 140 may transmit all of its encrypted credit screened market data to its market participants 142 at the same time using a point-to-multipoint or multipoint-to-multipoint transport protocol as well.

Reducing Peak Bandwidth During Transmission

In an implementation, one or more screeners 140 may, individually or collectively, delay transmission of the encrypted credit screened market data. For example, one or more screeners 140 may store the credit screened market data in a memory and transmit the credit screened market data periodically (e.g., every 50 milliseconds) between market updates. Doing so may advantageously reduce the amount of peak network traffic that typically occurs after a market update (e.g., after new CLOB state information is published by the venue), which may also result in fewer network errors such as dropped data packets. Thus, the system may leverage the encryption of credit screened market data and delay the transmission of encryption keys described herein to reduce peak network bandwidth usage as well.

Transmitting Encryption Keys

In an operation 208, market update distribution application 120 may obtain an indication that encrypted credit screened market data relating to a given time for a financial instrument has been transmitted to and/or received by each market participant 142 and, responsive to the indication, cause the encryption key used to encrypt the credit screened market data to be provided to each market participant 142.

Synchronizing the Provision of Encryption Keys

In an implementation, because the volume of market updates may be (and typically is) high, synchronization engine 130 may monitor the activity of screeners 140, which may operate in parallel with one another.

Synchronization engine 130 may synchronize provision of the encryption key to market participants based on whether each of the screeners 140 have provided relevant market updates to their respective sets of market participants 142. In other words, synchronization engine 130 may provide the encryption key to market participants 142 only when all of the market participants that should have been provided with market updates have received the market updates (or at least the market updates have been transmitted to all of such market participants).

Synchronization engine 130 may determine whether the encrypted credit screened market data were provided to market participants 142 in various ways. For example, synchronization engine 130 may obtain an indication from each screener 140 that it has distributed encrypted credit screened market data to its respective set of market participants 142. Alternatively or additionally, synchronization engine 130 may obtain an indication from a downstream listener, such as a passive or active network listener (not illustrated in FIG. 2), that it has detected screener 140 has provided encrypted credit screened market data to a market participant 142. Still alternatively or additionally, synchronization engine 130 may obtain an indication from each market participant 142 that it has received the encrypted credit screened market data. In whichever manner or combination of manners the indication is received, synchronization engine 130 may ensure that all market recipients 142 have received their respective encrypted credit screened market data before simultaneously providing an encryption key used to decrypt encrypted market update.

In an implementation, responsive to the indication that all market recipients 142 have received their respective encrypted credit screened market data, market update distribution application 120 may transmit the encryption key to each market participant 142, cause each screener to transmit the appropriate encryption key to each market participant 142, or otherwise make the encryption key available to each market participant 142.

Mapping Market Updates with Corresponding Encryption Keys

In an implementation, mapping engine 128 may associate encrypted credit screen market data with an encryption key used to encrypt credit screened market data. For example, mapping engine 128 may prepend or append a clear text string that is not encrypted to both the encrypted credit screened market data and the encryption key. In this manner, the clear text string may be used to associate the encrypted credit screened market data with the encryption key. In another example, mapping engine 128 may store a table that associates an identifier (e.g., a filename) of the encrypted credit screened market data with an identifier of a corresponding encryption key. In an implementation, mapping engine 128 may store the mapped encryption keys in database 134. For example, each encryption key used to encrypt the credit screened market data associated with the market update may be stored in database 134. It should be noted that key generator 126 may generate a new key for each market data update, for an individual financial instrument, for a set of financial instruments, and/or other groupings of data. Mapping engine 128 may be used to maintain associations of encryption keys and encrypted credit screened market data, regardless of when and how keys are generated.

The mapping between a given encrypted credit screened market data and corresponding encryption key may be used in various ways. For example, synchronization engine 130 may use the mapping to identify an encryption key that corresponds to encrypted credit screened market data that was provided to a given market participant 142. In another example, a market participant 142 may request an encryption key for corresponding encrypted credit screened market data. Market participant 142 may request the encryption key if it has not received an encryption key (e.g., after a timeout period in which it expects to have received the key). Such a market participant 142 may not have received the encryption key because the encryption key has not yet been transmitted to relevant market participants (e.g., some market participants have not yet received their respective encrypted credit screened market data for a financial instrument relating to a given time), or due to a network error, which may result from delivery of encryption key via a non-guaranteed delivery protocol such as multicast.

Since, unlike TCP/IP, the IP Multicast transport protocol does not guarantee delivery, the encryption key may not be faithfully delivered. In these instances, market participant 142 will not receive an encryption key and may request re-delivery by providing the encrypted credit screened data (or identification information such as a filename).

Market data distribution application 120 may identify the appropriate encryption key and determine whether the encryption key has already been provided to other market participants 142. Responsive to a determination that the encryption key has not been provided to other market participants 142, market data distribution application 120 may decline the request (and may provide a message that the encryption key is not yet available). Responsive to a determination that the encryption key has been provided to other market participants 142, market data distribution application 120 may decline the request (and may provide a message that the encryption key is not yet available). On the other hand, if the encryption key has not been provided to other market participants 142, market data distribution application 120 may provide the encryption key to the requesting market participant.

Upon receipt of the encryption key, market participants 142 may decrypt and decipher the credit screened market data including each market participant's credit screened prices and quantities. Multicast may simultaneously transmit one copy of the encryption key via the computer network, and network-related characteristics being equal, the market participants may receive that single copy of the encryption key at substantially same time.

Examples of System Architectures and Configurations

Different system architectures may be used. For example, all or a portion of market data distribution application 120 and/or one or more screeners 140 may be executed on a server device. In other words, computing device 110 as illustrated may include a server device that obtains a user request from a user device operated by the user. In implementations where all or a portion of market data distribution application 120 and/or one or more screeners 140 is executed on the server device, the server device perform all or a portion of the functionality of market data distribution application 120 and/or one or more screeners 140

Although illustrated in FIG. 1 as a single component, computer system 104 may include a plurality of individual components (e.g., computer devices) each programmed with at least some of the functions described herein. In this manner, some components of computer system 104 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The various databases 134 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 3:
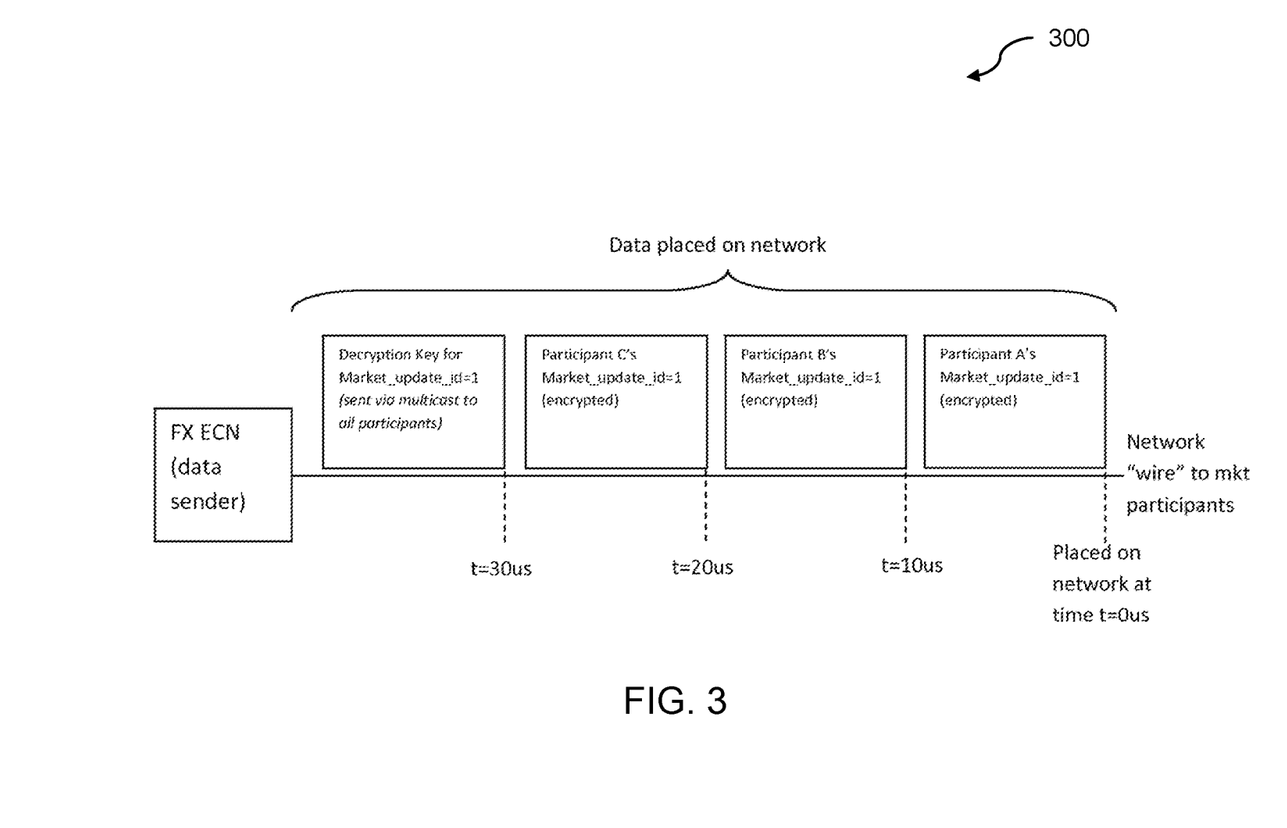
FIG. 3 depicts a data flow diagram for distributing fair credit screened market data, according to an implementation of the invention.

FIG. 3 depicts a data flow diagram 300 for distributing fair credit screened market data, according to an implementation of the invention. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In the exemplary data flow 300, encrypted credit screened market data may be transmitted to market participants A, B, and C, and t=0 μs ("μs" being microseconds). At t=0 μs, market participant A may receive the encrypted credit screened market data. At t=10 μs, market participant B may receive the encrypted credit screened market data. At t=20 μs, market participant C may receive the encrypted credit screened market data. Because the credit screened market data is encrypted, market participants A, B, and C are unable to decipher or understand the credit screened market data upon being received. At t=30 μs, market participants A, B, and C may receive the encryption key utilized to encrypt the credit screened market data. Upon receipt of the encryption key, market participants A, B, and C may be able to utilize the encryption key to decipher and understand the encrypted credit screened market data. As shown in the table below, market participants A, B, and C may receive the encrypted credit screened market data at different times, they are able to decipher or understand the credit screened market data at the same time after reception of the encryption key.

| Market Participant | Time when encrypted market data is received | Time when encryption key is received |
|---|---|---|
| A | t = 0 μs | t = 30 μs |
| B | t = 10 μs | t = 30 μs |
| C | t = 20 μs | t = 30 μs |

Figure 4:
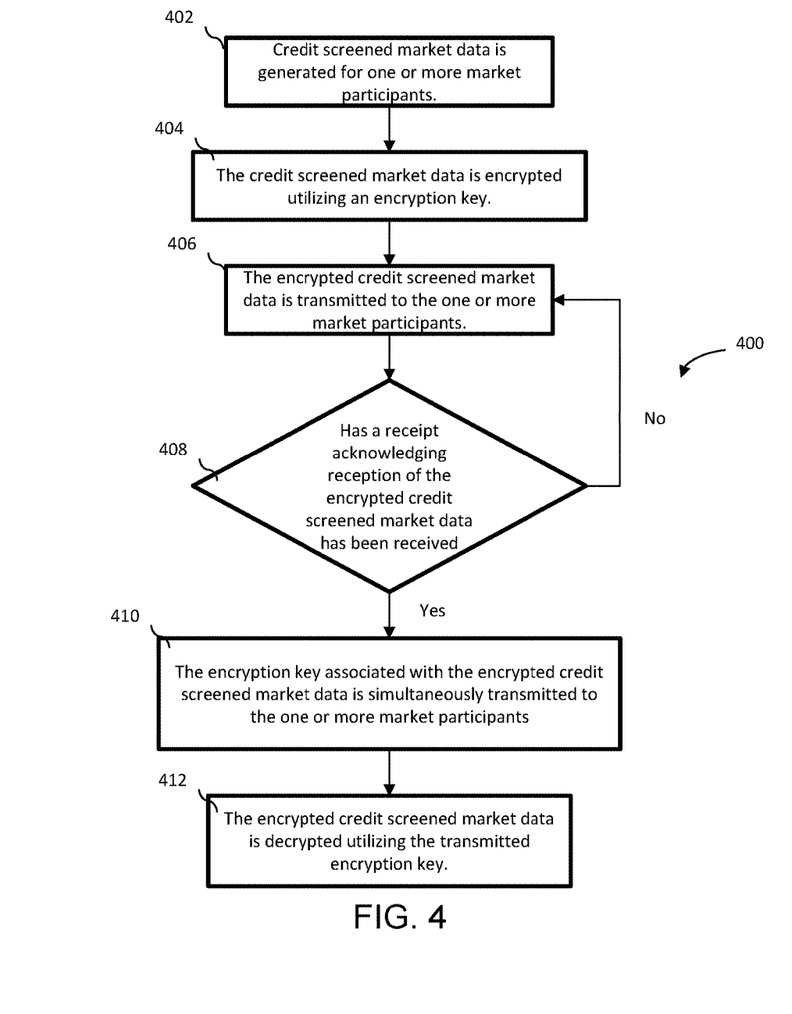
FIG. 4 depicts a process diagram for distributing fair credit screened market data, according to an implementation of the invention.

FIG. 4 depicts a process flow diagram 400 for a process of distributing credit screened market data, according to an implementation of the invention. The various processing operations and/or data flows depicted in FIG. 4 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 402, credit screened market data is generated for one or more market participants. In one implementation, credit screened prices and quantities associated with a financial instrument may be received for one or more market participants from an electronic trading system, such as a FX ECN and generate credit screened market data indicative thereof.

In an operation 404, the credit screened market data is encrypted utilizing an encryption key. For instance, credit screen market data may be encrypted utilizing a data encryption key. For example, a random encryption key may be generated prior to any credit screened prices and quantities updates that may be transmitted to the market participants. The random key may be utilized to encrypt all (or a portion) of the credit screened market data before the credit screened prices and quantities are transmitted to the market participants.

In an operation 406, the encrypted credit screened market data is transmitted to the one or more market participants. In one implementation, the encrypted credit screened market data may be transmitted at predetermined times to the one or more market participants between market updates. Because the credit screened market data is encrypted, market participants are unable to decipher or understand the credit screened market data upon being received.

In an operation 408, it is determined if a receipt acknowledging reception of the encrypted credit screened market data has been received from the one or more market participants.

In an operation 408, in response to receiving a receipt acknowledging reception of the encrypted credit screened market data has been received from the one or more market participants, the encryption key associated with the encrypted credit screened market data is simultaneously transmitted to the one or more market participants. For instance, after the market participants have been sent the encrypted credit screened market data for a given market data update, the encryption key which was utilized to encrypt the credit screened market data, is transmitted to the market participants utilizing a multicast transport protocol. In one implementation, a multicast transport protocol may be utilized to transmit (network-characteristics being equal) the market participants the encryption key at the same time. Upon receipt of the encryption key, the market participants may decrypt and decipher the credit screened market data including each market participant's credit screened prices and quantities.

If a receipt acknowledging reception of the encrypted credit screened market data has not been received from the one or more market participants, the encrypted credit screened market data is re-transmitted to the one or more market participants after a predetermined time period.

In an operation 410, the encrypted credit screened market data is decrypted utilizing the transmitted encryption key.

Throughout the above description, the terms (IP) Multicast and TCP/IP are used. These are widely used and widely-understood "standard" network protocols. The use of these specific terms is not meant to limit the applicability of the mechanism to just these specific network protocols. In the context of this document the term multicast maybe understood to be any current or future network protocol in which the sender places a single copy of a message on the electronic network, regardless of the number of recipients to which the message will be delivered. Similarly, unless otherwise noted in the text (particularly with respect to reliability), TCP/IP is simply used to denote any protocol in which there is generally one copy of message per recipient placed on the electronic network by the sender.

Throughout the preceding text the term encryption key may be used to refer to both the key used to encrypt the data, and the key used to decrypt it. In an asymmetric encryption scheme there would be a pair of distinct keys: the decryption key would be the one sent to the recipients (market participants), the encryption key would be used by the sender to encrypt the data. In the preceding text it is to be understood the "encryption key" may refer to either the key used to encrypt the data, or the key used to decrypt it, depending on the context and these keys maybe the same (as in a symmetric encryption scheme) or distinct (as in an asymmetric encryption scheme).

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of distributing credit-screened market data, the method being implemented in a computer system having one or more physical processors programmed with computer program instructions that, when executed by the one or more physical processors, cause the computer system to perform the method, the method comprising:

generating, by the computer system, first credit-screened market data for a first data recipient;

generating, by the computer system, second credit-screened market data for a second data recipient;

encrypting, by the computer system, at least a portion of the first credit-screened market data and a portion of the second credit-screened market data using an encryption key;

transmitting, by the computer system, the encrypted first credit-screened market data to the first data recipient and the encrypted second credit-screened market data to the second data recipient over an electronic communication network;

determining, by the computer system, that the encrypted first credit-screened market data has been received by the first data recipient via an indication from a first downstream listener and that the encrypted second credit-screened market data has been received by the second data recipient via an indication from a second downstream listener; and transmitting, by the computer system and in response to the determination that the encrypted first and second credit screened market data has been received by the first and second data recipients, the encryption key simultaneously to the first data recipient and the second data recipient, whereby the encrypted first and second credit-screened market data are decrypted by the first and second data recipients using the encryption key so that the encrypted first and second credit-screened market data are thereafter accessible to the first and second data recipients at substantially the same time.

2. The method of claim 1, wherein the encryption key is transmitted to the first data recipient and the second data recipient utilizing a Multicast transport protocol.

3. The method of claim 2, wherein a respective copy of the encryption key is transmitted to the first data recipient and the second data recipient.

4. The method of claim 1, wherein the first market includes price and quantity data for a given financial instrument.

5. The method of claim 1, wherein the encrypted portion of the first credit-screened market data cannot be deciphered by the first data recipient and the encrypted portion of the second credit-screened market data cannot be deciphered by the second data recipient before the encryption key is transmitted by the computer system.

6. The method of claim 1, the method further comprising:
generating, by the computer system, third credit-screened market data for the first data recipient;
encrypting, by the computer system, at least a portion of the third credit-screened market data using a second encryption key different than the encryption key; and
transmitting, by the computer system, the third credit-screened market data to the first data recipient.

7. The method of claim 1, wherein the encrypted first credit-screened market data is transmitted at a predetermined time to the first data recipient and second data recipient.

8. The method of claim 1, the method further comprising:
decrypting the encrypted portion of the first credit-screened market data utilizing the transmitted encryption key; and
displaying at least the decrypted portion of the first credit-screened market data on a display device.

9. A system of distributing credit-screened market data, the system comprising:
a computer system having one or more physical processors programmed with computer program instructions to:
generate first credit-screened market data for a first data recipient;
generate second credit-screened market data for a second data recipient;
encrypt at least a portion of the first credit-screened market data and a portion of the second credit-screened market data using an encryption key;
transmit the encrypted first credit-screened market data to the first data recipient and the encrypted second credit-screened market data to the second data recipient over an electronic communication network;
determine that the encrypted first credit-screened market data has been received by the first data recipient via an indication from a first downstream listener and that the encrypted second credit-screened market data has been received by the second data recipient via an indication from a second downstream listener; and
transmit, in response to the determination that the encrypted first and second credit screened market data has been received by the first and second data recipients, the encryption key simultaneously to the first data recipient and the second data recipient, whereby the encrypted first and second credit-screened market data are decrypted by the first and second data recipients using the encryption key so that the encrypted first and second credit-screened market data are thereafter accessible to the first and second data recipients at substantially the same time.

10. The system of claim 9, wherein the encryption key is transmitted to the first data recipient and the second data recipient utilizing a Multicast transport protocol.

11. The system of claim 10, wherein a respective copy of the encryption key is transmitted to the first data recipient and the second data recipient.

12. The system of claim 9, wherein the first market includes price and quantity data for a given financial instrument.

13. The system of claim 9, wherein the encrypted portion of the first credit-screened market data cannot be deciphered by the first data recipient and the encrypted portion of the second credit-screened market data cannot be deciphered by the second data recipient before the encryption key is transmitted by the computer system.

14. The system of claim 9, wherein the computer system is further programmed to:
generate third credit-screened market data for the first data recipient;
encrypt at least a portion of the third credit-screened market data using a second encryption key different than the encryption key; and
transmitting, by the computer system, the third credit-screened market data to the first data recipient.

15. The system of claim 9, wherein the encrypted first credit-screened market data is transmitted at a predetermined time to the first data recipient and second data recipient.

16. The system of claim 9, wherein the computer system is further programmed to:
decrypt the encrypted portion of the first credit-screened market data utilizing the transmitted encryption key; and
display at least the decrypted portion of the first credit-screened market data on a display device.

17. A non-transitory computer readable medium storing computer instructions for distributing credit screened market data, the instructions, when executed by one or more physical processors of a computer system, cause the computer system to:
generate first credit-screened market data for a first data recipient;
generate second credit-screened market data for a second data recipient;
encrypt at least a portion of the first credit-screened market data and a portion of the second credit-screened market data using an encryption key;
transmit the encrypted first credit-screened market data to the first data recipient and the encrypted second credit-screened market data to the second data recipient over an electronic communication network;
determine that the encrypted first credit-screened market data has been received by the first data recipient via an indication from a first downstream listener and that the encrypted second credit-screened market data has been received by the second data recipient via an indication from a second downstream listener; and
transmit, in response to the determination that the encrypted first and second credit screened market data has been received by the first and second data recipients, the encryption key simultaneously to the first data recipient and the second data recipient, whereby the encrypted first and second credit-screened market data are decrypted by the first and second data recipients using the encryption key so that the encrypted first and second credit-screened market data are thereafter accessible to the first and second data recipients at substantially the same time.

18. The non-transitory computer readable medium of claim 16, wherein the encryption key is transmitted to the first data recipient and the second data recipient utilizing a Multicast transport protocol.

19. The non-transitory method of claim 1, further comprising mapping, by the computer system, the encryption key to the first credit-screened market data and second credit-screened market data.

20. The non-transitory method of claim 1, further comprising displaying the decrypted first credit screened market data at the first data recipient and the decrypted second credit screened market data at the second data recipient.

* * * * *